(12) United States Patent
Lee et al.

(10) Patent No.: US 11,570,535 B2
(45) Date of Patent: Jan. 31, 2023

(54) MOVING ROBOT

(71) Applicant: LG ELECTRONICS INC., Seoul (KR)

(72) Inventors: Byeongmin Lee, Seoul (KR); Byungdoo Yim, Seoul (KR); Haejun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/471,850

(22) Filed: Sep. 10, 2021

(65) Prior Publication Data

US 2022/0014831 A1  Jan. 13, 2022

Related U.S. Application Data

(63) Continuation of application No. 17/032,319, filed on Sep. 25, 2020, now Pat. No. 11,140,468.

(30) Foreign Application Priority Data

Sep. 27, 2019 (KR) .................. 10-2019-0120066

(51) Int. Cl.
*H04R 21/02* (2006.01)
*H04R 17/02* (2006.01)
*H04R 9/08* (2006.01)
*H04R 11/04* (2006.01)
*H04R 19/04* (2006.01)
(Continued)

(52) U.S. Cl.
CPC ............... *H04R 1/028* (2013.01); *H04R 1/08* (2013.01)

(58) Field of Classification Search
CPC .................................. H04R 1/028; H04R 1/08
See application file for complete search history.

(56) References Cited

U.S. PATENT DOCUMENTS

2008/0039974 A1  2/2008 Sandin
2012/0209433 A1  8/2012 Paz Rodriguez
(Continued)

FOREIGN PATENT DOCUMENTS

JP  2017-064064 A  4/2017
KR  10-2004-0081874  9/2004
(Continued)

OTHER PUBLICATIONS

PCT Search Report dated Mar. 3, 2021 issued in Application PCT/KR2020/012801.
(Continued)

*Primary Examiner* — Simon King
(74) *Attorney, Agent, or Firm* — Ked & Associates LLP

(57) ABSTRACT

A moving robot may include a main body which forms a space therein, an inner housing which surrounds the main body, an outer housing, two voice recognition members/devices (or voice sensors) which are disposed in the housings and are disposed to be separated from each other, and a microphone mount which is supported by the inner housing and causes the voice recognition device to be in close contact with the outer housing. The microphone mount may include a bending prevention rib which is disposed below the microphone mount to prevent bending of the microphone mount, and a twist prevention rib which is disposed below the microphone mount to prevent twisting of the microphone mount.

20 Claims, 10 Drawing Sheets

(51) Int. Cl.
  *H04R 1/02* (2006.01)
  *H04R 1/08* (2006.01)

(56) References Cited

U.S. PATENT DOCUMENTS

| | | | | |
|---|---|---|---|---|
| 2018/0308470 | A1* | 10/2018 | Park | G10L 15/063 |
| 2018/0308482 | A1* | 10/2018 | Ro | G10L 15/26 |
| 2018/0308483 | A1* | 10/2018 | Myoung | G10L 15/30 |
| 2018/0308490 | A1* | 10/2018 | Lim | G10L 15/22 |
| 2018/0317725 | A1* | 11/2018 | Lee | B25J 11/0085 |
| 2020/0001469 | A1 | 1/2020 | Park | |
| 2020/0133275 | A1 | 4/2020 | Yoon | |

FOREIGN PATENT DOCUMENTS

| | | |
|---|---|---|
| KR | 10-2006-0117003 A | 11/2006 |
| KR | 10-2014-0071740 A | 6/2014 |
| KR | 10-2019-0024454 A | 3/2019 |

OTHER PUBLICATIONS

U.S. Notice of Allowance dated Jun. 7, 2021 issued in parent U.S. Appl. No. 17/032,319.

* cited by examiner

MOVING ROBOT

CROSS-REFERENCE TO RELATED APPLICATIONS

This application is a Continuation Application of U.S. patent application Ser. No. 17/032,319 filed Sep. 25, 2020, which claims priority under 35 U.S.C. § 119 to Korean Application No. 10-2019-0120066, filed Sep. 27, 2019, whose entire disclosure is hereby incorporated by reference.

BACKGROUND

1. Field

The present disclosure relates to a moving robot, and more particularly, to a moving robot that includes a voice recognition member for recognizing a voice command of a user to control the moving robot.

2. Background

A robot has been developed for industrial use and has been responsible for a portion of factory automation. A field of applications of a robot has further expanded. For example, a medical robot, an aerospace robot, or the like has been developed, and a home robot may be used in homes. Among these robots, a moving robot can be driven by a magnetic force.

A moving robot may be a device that moves and performs a specific operation. The moving robot including a cleaning robot can perform a variety of operations. The moving robot essentially includes a driving module for movement, a corresponding operation module for performing a specific operation, a controller for controlling the driving module or operation module, and an input unit that includes a built-in program to control the moving robot or to which a command of a user is input.

The input unit (of the moving robot) may include a button, a receiver that includes a separate remote control to communicate with the remote control, and/or a microphone that recognizes the voice command of the user. A microphone that recognizes the voice command of the user may recognize the voice command of the user with a voice sensor and converts the recognized voice command into data. The converted data is transmitted to the controller to be processed. In this example, the microphone should convert only voice commands into data, and should remove a noise. However, it may not be easy to remove the noise and convert only the voice command into data. Thus, research may be performed to increase voice recognition efficiency.

The moving robot essentially has a driving motor for traveling. However, since the driving motor causes a noise, there is a problem that noise is included in a large part when a microphone recognizes a voice.

Accordingly, in related art such as KR10-2004-0081874, the subject matter of which is incorporated herein by reference, a microphone is not mounted on a body of a robot cleaner to improve a voice recognition rate, but rather the microphone is mounted on a separate module and receives a voice processing result through RF communication. However, in the related art, there is a problem that management is inconvenient because the module (i.e., voice recognition processing means) is separate from the body of the robot cleaner.

On the other hand, when the microphone is mounted on the body of the robot cleaner, there may be a problem in that noise emitted from the robot cleaner (including the drive motor) may be recognized as a voice command. Thus, the related art has not provided a solution to this problem.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
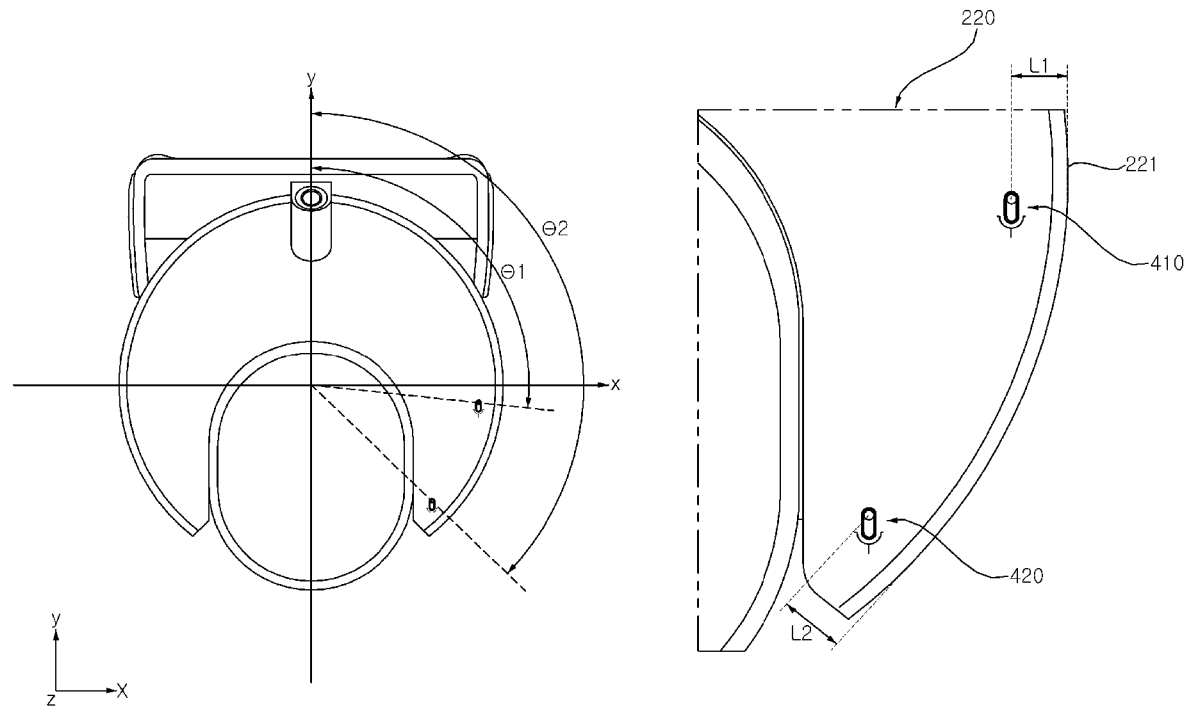
FIG. 1 is a plan view of a moving robot.

Advantages and features of the present disclosure, and a method of achieving them may become apparent with reference to embodiments described below in detail with the accompanying drawings. However, the present disclosure is not limited to the embodiments disclosed below, but may be implemented in a variety of different forms, and only these embodiments are provided to ensure that the disclosure of the present disclosure is complete, and to fully inform a scope of the embodiments to a person having ordinary knowledges in a technical field to which the present disclosure belongs, and the present disclosure is defined by only a scope of the claim. The same reference numerals refer to the same components throughout the specification.

The present disclosure may be described with reference to the drawings for describing a moving robot according to embodiments of the present disclosure.

A direction in which the moving robot moves forward refers to a front, and a side opposite to the front refers to a rear. A y axis is a vertical center axis, and the front is in a + direction. The vertical center axis is a straight line connecting a front end of the moving robot and a rear end of the moving robot to each other.

Based on the y axis, a right thereof is referred to as a right side and a left thereof is referred to as a left side. An x axis is a horizontal center axis, and the right side is the + direction. The horizontal central axis is a straight line connecting a left end of the moving robot and a right end of the moving robot to each other. A point where the x axis and the y axis intersect each other is defined as a central point O.

A noise generating member (or noise generating device) may include all members that may generate a noise when the voice recognition member recognizes the voice command, such as a driving motor that moves the moving robot, a suction motor that sucks foreign substances, a sweep motor that moves a brush, and/or other motors that provide other driving forces.

Figure 2:
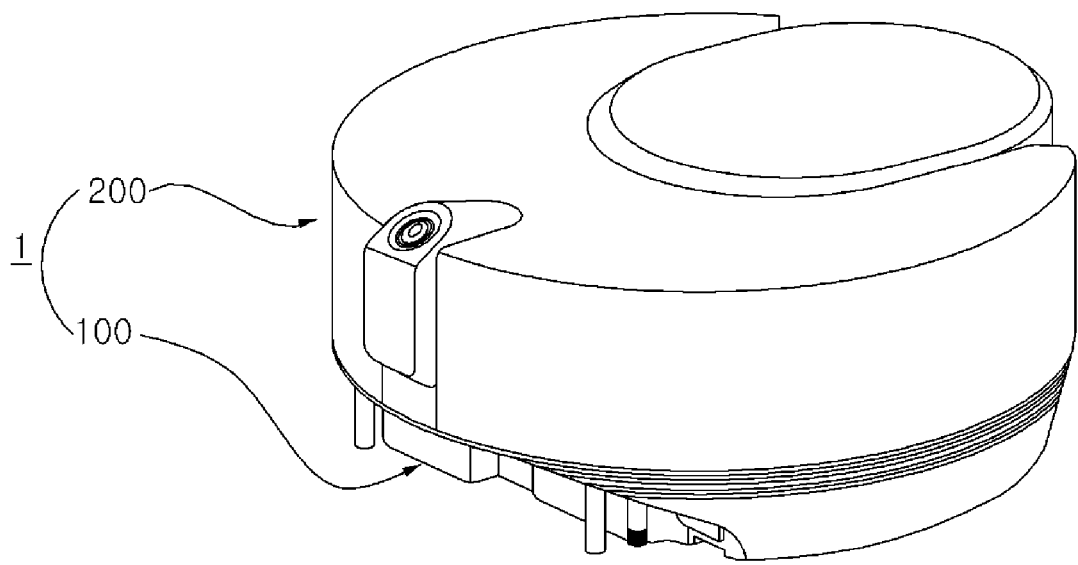
FIG. 2 is a perspective view of the moving robot.
Figure 3:
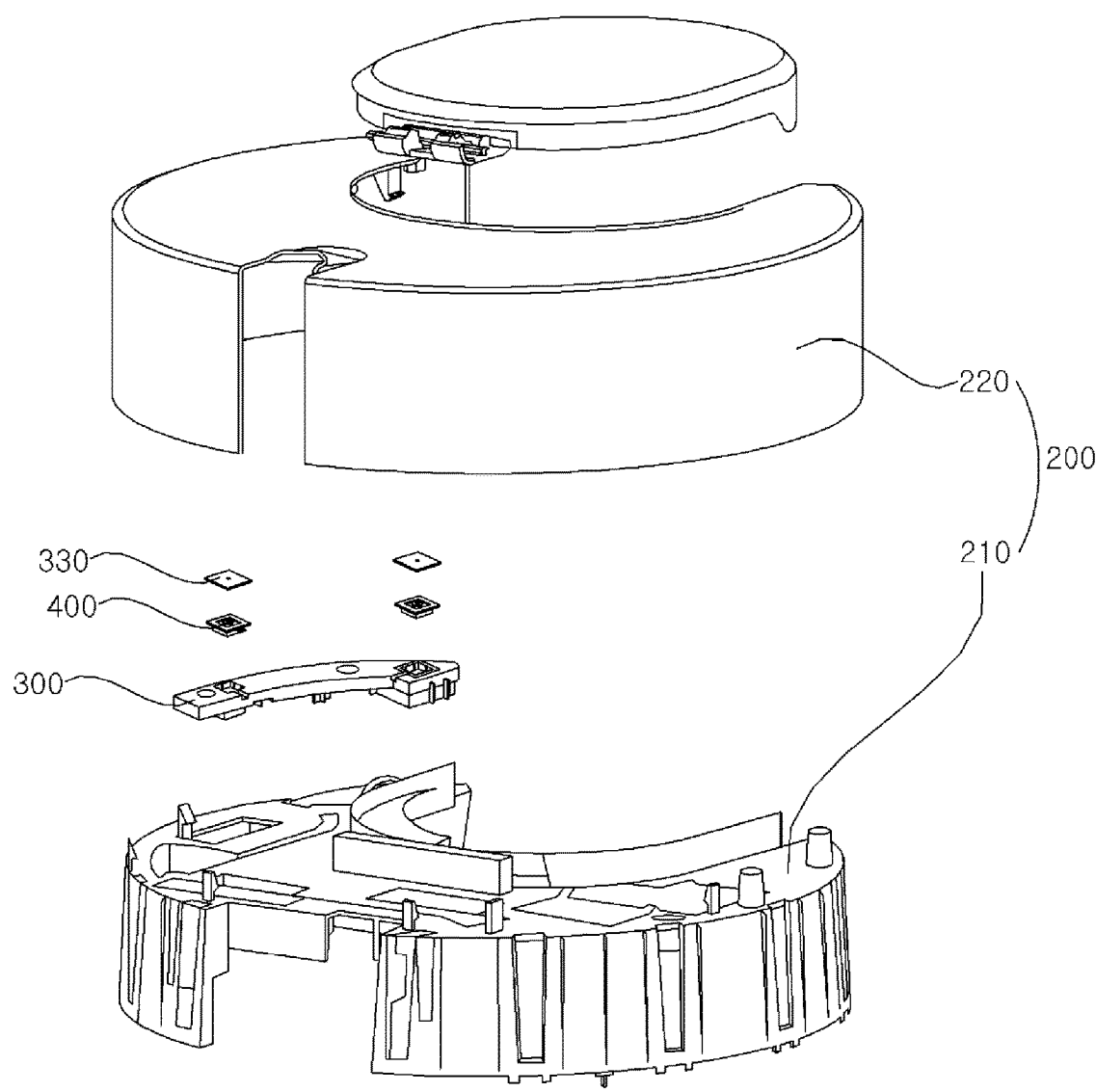
FIG. 3 is a partially exploded view of the moving robot.

The moving robot has a main body 100 that configures a skeleton and forms a space therein. As shown in FIG. 2, the main body 100 may have a shape similar to a wide cylinder. However, the main body 100 is not limited to the shape of FIG. 2 and includes a degree of change that can be easily made by a person skilled in the art.

An inner space of the main body 100 includes a battery that receives external power and is charged. The battery may receive external power and may be charged when not in operation, and supplies power to each module (or device) during operation.

The inner space of the main body 100 includes a driving module for moving the main body 100. The driving module may include a driving motor which supplies a driving force. The driving motor may be disposed in the inner space of the main body 100. The driving motor may be an electric motor which is operated by electricity, and may generate a noise during operation. The driving module may include a driving wheel. The driving wheel may receive the driving force from the driving motor to move the moving robot. A plurality of driving wheels may be disposed. The driving wheels can be symmetrically disposed right-left based on a center of gravity of the moving robot. There may be one driving motor which transmits driving force to each driving wheel, or a driving motor may be disposed for each driving wheel. If multiple driving motors are disposed, more noise may be generated.

The inner space of the main body 100 may include a vacuum cleaning module which sucks and cleans foreign substances by a negative pressure. The vacuum cleaning module sucks external foreign substances with air, stores the sucked foreign substances in a dust bin, and discharges only the sucked air to the outside of the moving robot. The vacuum cleaning module may include a suction motor 511 (FIG. 6) which provides a negative pressure, a sucker which sucks the air and foreign substances by the negative pressure, a filter which separates the sucked foreign substances, the dust bin which stores the separated foreign substances, and an air outlet 512 (FIG. 6) through which the sucked air is discharged to the outside. The suction motor 511 is a motor which provides power to a component which compresses air, and provides the negative pressure for sucking the foreign substances. The suction motor 511 is operated by electricity charged in the battery, and a noise may be generated during a process of compressing air. The air sucked from the sucker passes through the filter, but the sucked foreign substances cannot pass through the filter. The filter may generate a noise while filtering the air or foreign substances. The air outlet 512 discharges air which has passed through the filter to the outside. The air outlet 512 may additionally include a filter in a process of discharging the air, and a noise may be generated while the air is discharged to the outside. When the foreign substances are stored in the dust bin, the foreign substances may move while the moving robot moves, and thus a noise may be generated.

The inner space of the main body 100 may include a sweep module which sweeps and cleans the external foreign substances with a brush. The sweep module may be a square-shaped module disposed in a front portion of the moving robot of FIG. 1. The sweep module may include a brush for sweeping the foreign substances existing on a floor, a sweep motor for moving the brush, and a dust bin for storing the wiped foreign substances. The brush can come into repeated contact with the floor while sweeping the foreign substances. In a process in which the brush comes into repeated contact with the floor, a noise due to a friction may be generated. The sweep motor may include an electric motor and can be operated by electricity charged in a battery to move the brush. A noise may also be generated when the sweep motor is operated while performing cleaning. When foreign substances are stored in the dust bin, the foreign substances are moved while the moving robot moves, and thus a noise may be generated.

The inner space of the main body 100 may include a wet cleaning module which wipes off the external foreign substances with a mop to perform cleaning. The wet cleaning module may include a mop for wiping off the external foreign substances, a bucket for supplying water to the mop, and a motor for moving the mop. The mop is moved while coming into repeated contact with the floor, and a noise may be generated due to friction between the mop and the floor. A noise may be generated while operating the motor to move the mop.

The moving robot may be controlled by a controller which is a hardware component. The controller can control the moving robot based on a program (and/or instructions) already designed and stored. The controller may control the moving robot based on data detected by various sensors disposed on the moving robot. The controller may receive a command of a user from a separately provided input device to control the moving robot. When a voice recognition device 400 (or voice recognition member/module) recognizes (or determines) a voice command of the user, the controller may analyze the voice command and control the moving robot. The voice recognition device may include a voice sensor.

A method of recognizing a voice of the user through the voice recognition device 400 (or voice sensor) may be described. The moving robot may include a voice recognition system which receives voice data from the voice recognition device 400, analyzes the voice data, and determines a voice command based on the analyzed voice data.

The voice recognition device 400 may include a voice sensor for receiving the voice of the user, and a printed circuit board for processing an audio signal received by the voice sensor as an electrical signal. The voice recognition device 400 may include a connector which is connected to the printed circuit board and to which a connection line connected to the voice recognition transmission module is connected.

The voice recognition device 400 may be disposed inside the outer housing 220 or below the outer housing 220. In the outer housing 220, a communication hole may be provided at a portion where the voice sensor of the voice recognition device 400 is provided. More specifically, a first communication hole 223 (FIGS. 7-8) may penetrate a portion vertically overlapping the voice sensor of the voice recognition device 400. The voice of the user may be detected by a microphone through the first communication hole 223.

The voice recognition system may receive the voice data from the voice recognition device 400, convert the received voice data into text data, and analyze the text data to determine the voice command. Additionally, the voice recognition system may transmit a signal corresponding to the determined voice command to the controller to control the moving robot. The voice recognition system may perform natural language processing such as reception and preprocessing of the voice command, voice/text conversion, intention analysis, and command identification.

A plurality of voice recognition devices 400 (e.g. voice sensor or voice recognition members) may be provided in order to more accurately receive the voice command of the user. The plurality of voice recognition devices 400 may be disposed at different positions. The voice recognition device 400 may include two voice recognition devices 400 in order to secure voice recognition performance. FIG. 1 shows that two voice recognition devices 400 are provided, namely a first voice recognition device 410 located in the relatively front, and a second voice recognition device 420 located in the relatively rear.

The two voice recognition devices 400 are disposed to be separated from each other at a predetermined interval. According to an example embodiment, noise can be eliminated by comparing voices input from two microphones.

The first voice recognition device 410 may recognize the voice command of the user, and may recognize a noise generated inside the moving robot. The second voice recognition device 420 may also recognize the voice command of the user, and may recognize the noise generated inside the moving robot. First noise data in which the noise is recognized by the first voice recognition device 410 and second noise data in which the noise is recognized by the second voice recognition device 420 have a difference by a distance between the respective voice recognition devices. First voice data in which the voice command of the user is recognized by the first voice recognition device 410 and second voice data in which the voice command of the user is recognized by the second voice recognition device 420 have a difference by the distance between the respective voice recognition members.

The controller may extract accurate voice data based on the first voice data and the second voice data. Additionally, the controller may extract more accurate voice data by extracting and removing accurate noise data based on the first noise data and the second noise data.

The voice recognition device 400 may be disposed inside the outer housing 220 or below the outer housing 220. In the outer housing 220, the communication hole is formed at a position where the voice sensor of the voice recognition device 400 is disposed. More specifically, the first communication hole 223 is to penetrate a portion vertically overlapping the sensor of the microphone. The voice of the user is introduced into the housing through the first communication hole 223, and is sensed by the voice sensor of the voice recognition device 400.

The moving robot may include the main body 100 which forms a space therein. The main body 100 may include the driving module. The main body 100 may include at least one of a suction module, the wet cleaning module, the vacuum cleaning module, and the sweep module depending on the purpose, and may further include other modules. According to the present embodiment, the module may include a motor or the like for operations, and the above-described components may cause noise during operations.

The moving robot may include the housing 200 surrounding the main body 100. The housing 200 surrounds at least a portion (or part) of the main body 100. The housing 200 may cover an upper surface or a side surface of the main body 100. The housing 200 may form an outer shape of the moving robot 1.

The housing 200 may include the inner housing 210 which is disposed inside the outer housing 220 and surrounds an outside of the main body 100. The inner housing 210 may cover at least a portion of the main body 100. The inner housing 210 may cover the upper surface or the side surface of the main body 100. The inner housing 210 may absorb a shock applied to the moving robot to protect the main body 100 from the shock.

The housing 200 may include the outer housing 220 which is disposed outside the inner housing 210 to surround the inner housing 210. The outer housing 220 may be coupled to the inner housing 210. The outer housing 220 may cover the upper surface and the side surface of the inner housing 210, and may form the outer shape of the moving robot. The outer housing 220 may be formed in a circular shape as shown in FIG. 1.

The housing may include the inner housing 210 and the outer housing 220 in a broad meaning, and may refer to only the outer housing 220 in a narrow meaning. Accordingly, the voice recognition device 400 may be disposed in a space between the inner housing 210 and the outer housing 220. Alternatively, the voice recognition device 400 may be disposed in a space between the housing and the main body 100.

A motor may be disposed in the inner space of the main body 100. The motor may include one or more of a driving motor included in the driving module, a suction motor 511 included in the vacuum cleaning module, a motor included in the sweep module to move the brush, and a motor included in the wet cleaning module to move the mop. In addition to the motors described above, motors within a range which can be easily derived by a person skilled in the art may be included.

The motors may be a noise generating member 510 that generates a noise. That is, the noise generating member 510 may include any one or more of the above-described motors, and may include a component which may generate a noise such as the air outlet 512 in addition to the motors.

The voice recognition device 400 is a component which recognizes the voice emitted by a user, and includes the voice sensor that recognizes sound. A space may be formed between the housing 200 and the main body 100, and the voice recognition device 400 may be disposed in the formed space. More specifically, a space may be formed between the inner housing 210 and the outer housing 220, and the voice recognition device 400 may be disposed in the formed space.

Disposition on Cartesian Coordinate System

Figure 6:
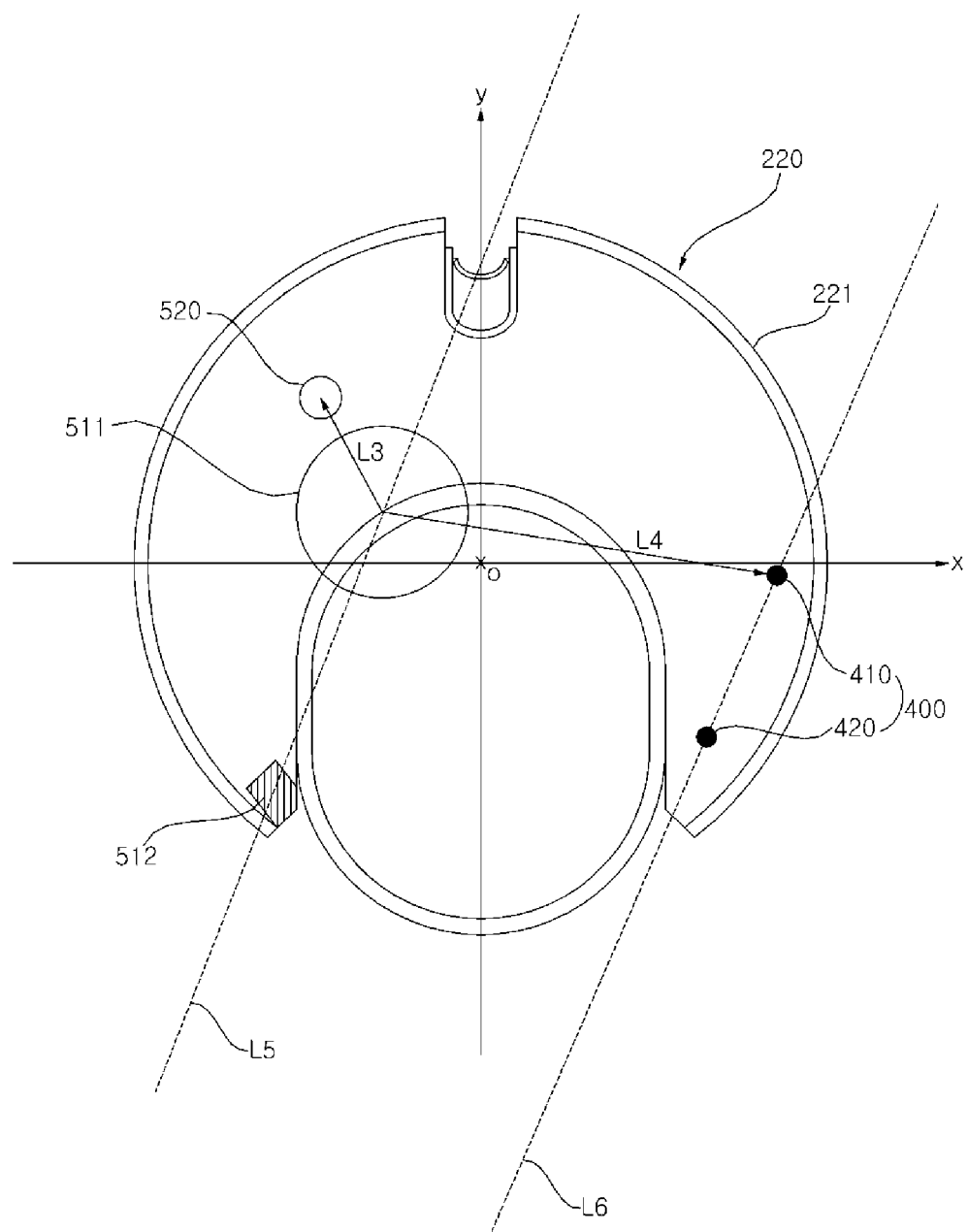
FIG. 6 is a layout diagram of the voice recognition module with respect to a position of a noise generating module.

A disposition of the voice recognition device 400 according to an example embodiment may be described on a Cartesian coordinate system with reference to FIG. 6. FIG. 1 is a plan view of the moving robot viewed from above. FIG. 6 is a view schematically illustrating main components disposed in the moving robot in FIG. 1. As shown in FIG. 6, the central point O may be specified at an intersection of the x axis (horizontal center axis) and the y axis (vertical center axis).

The voice recognition device 400 may have two or more voice recognition devices 410 and 420 separated from each other. The two or more voice recognition devices 410 and 420 may be disposed on a side opposite to the motor based on a virtual straight line passing through the central point O when viewed from above.

When the moving robot is viewed from above, virtual straight lines passing through the central point O can be arbitrarily arranged. For example, a virtual straight line passing through a first and third quadrants in an x-y plane may be disposed. Based on the virtual straight line, the motor may be disposed on a front left side, and two or more voice recognition members 410 and 420 may be disposed on a rear right side.

When the virtual straight line having the central point O is the x axis, the motor may be disposed in a front side of the x axis, and the voice recognition device 400 may be disposed in a rear side of the x-axis.

When the virtual straight line having the central point O is the y axis, the motor may be disposed on a left side of the y axis, and the voice recognition device 400 may be disposed on a rear side of the y axis.

Therefore, based on the virtual straight line passing through the central point O, components which may generate a noise are disposed on one side in a concentration manner, and the voice recognition device 400 is disposed on the other side. Thus, mixing of the noise in the voice recognition device 400 may be minimized. In addition, the components may be easily disposed to maximize voice recognition performance.

The moving robot may include the suction motor 511 which is disposed on one side based on the virtual straight line and which sucks the foreign substances together with air. Additionally, the main body 100 may include the air outlet 512 which is disposed on the same side as the suction motor 511 based on the virtual straight line and through which only the sucked air is discharged to the outside. The voice recognition device 400 is disposed on the other side of the virtual straight line.

According to an example embodiment, two or more noise generating members 510 may be provided. For example, in an example where the moving robot 1 includes the vacuum cleaning module, the suction motor 511, which sucks the external foreign substances, and the air outlet 512 through which the sucked air is discharged to the outside are provided, and the noise may be generated at the same time in two separated portions.

In this example, the virtual straight line may be drawn which passes through the central point O and separates the suction motor 511 and the air outlet 512 on one side, and the voice recognition device 400 may be disposed on the other side. Therefore, it is possible to easily design the disposition capable of minimizing the mixing of the noise in the voice recognition device 400.

According to an example embodiment, a certain rule is placed between the two noise generating devices 510 and the two voice recognition devices 400 so that the members can be easily and effectively disposed.

A straight line L5 passing through the two noise generating devices (or members) may be disposed, and a straight line L6 passing through the two voice recognition devices may be disposed. The straight line L5 passing through the noise generating device (or member) may be a straight line connecting the suction motor 511 and the air discharge port.

The straight line L5 passing through the two noise generating devices and the straight line L6 passing through the two voice recognition devices may be disposed on sides opposite to each other based on the central point O. That is, the straight line L5 passing through the two noise generating devices and the straight line L6 passing through the two voice recognition devices based on the central point O may be disposed on the sides opposite to each other.

Therefore, when positions of the two noise generating members 510 are first specified, positions of the two voice recognition devices 400 can be easily designed so that the voice recognition efficiency is maximized. Conversely, when the two voice recognition devices 400 are first specified, positions of the noise generating members 510 can be easily designed so that the voice recognition efficiency is maximized.

The straight line L5 passing through the two noise generating devices and the straight line L6 passing through the two voice recognition devices may be parallel to each other.

A preferred disposition of the first voice recognition device 410 and the second voice recognition device 420 may be described. The voice recognition device 400 may include the first voice recognition device 410 and the second voice recognition device 420 which is disposed to be separated from the first voice recognition device 410.

A communication hole penetrating the housing may be formed above the voice recognition device 400. When the voice recognition device 400 includes the first voice recognition device 410 and the second voice recognition device 420, one communication hole may be formed above the first voice recognition device 410, and a communication hole which is different from the above-described communication hole may be formed above the second voice recognition device 420. That is, one communication hole is formed at one voice recognition device 400, and the number of voice recognition devices 400 and the number of communication holes are the same as each other. The communication hole may include the first communication hole 223 formed to penetrate the housing, and a second communication hole 331 formed to penetrate a microphone gasket 330.

The second voice recognition device 420 may be disposed behind the first voice recognition device 410. Therefore, a difference may occur in voice data by a front-rear interval between the first voice recognition device 410 and the second voice recognition device 420. The controller can maximize voice recognition performance by removing the noise based on the differences in voice data and acquiring the voice command of the user.

Figure 5:
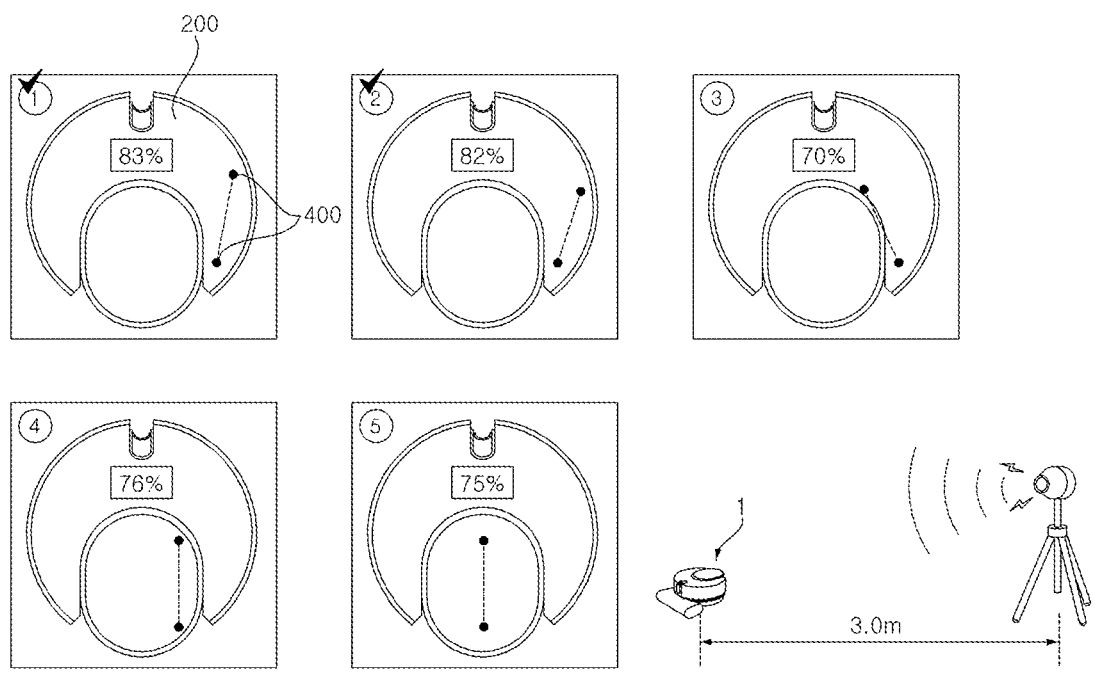
FIG. 5 is various layout diagrams of the voice recognition module when the moving robot is viewed from above.

Referring to FIG. 5, the second voice recognition device 420 may be disposed closer to the vertical center axis (y axis) than the first voice recognition device 410. A difference occurs in voice data by a right-left interval between the first voice recognition device 410 and the second voice recognition device 420. The controller can maximize the voice recognition performance by removing the noise based on the difference in voice data and acquiring the voice command of the user.

FIG. 5 shows various layout diagrams of the first voice recognition device 410 and the second voice recognition device 420 when viewed from above. In FIG. 5, a criterion for determining the voice recognition efficiency is set to 80%. In other words, if the voice recognition efficiency of the voice recognition device 400 exceeds 80%, it is assumed that sufficient voice recognition performance is provided. Therefore, if the first voice recognition device 410 is disposed outside the front of the second voice recognition device 420, and the second voice recognition device 420 is disposed inside the rear from the first voice recognition device 410, the voice recognition performance is maximized.

Disposition on Polar Coordinate System

Referring to the drawings, the moving robot of the present disclosure may be formed in a circular shape. Thus, it may be easier to use a Polar coordinate system than a Cartesian coordinate system in order to dispose components in the circular moving robot. Therefore, components may be arranged based on the central point O as follows.

The first voice recognition device 410 and the second voice recognition device 420 may be disposed along an outer peripheral surface 221 of the housing.

The first voice recognition device 410 and the second voice recognition device 420 may be disposed on an inner wall of the outer peripheral surface 221 of the housing, and may be disposed to be separated from each other along the outer peripheral surface 221. The first voice recognition device 410 and the second voice recognition device 420 may be disposed on the inner wall of the outer peripheral surface 221 of the outer housing 220, and may be disposed to be separated from each other along the outer peripheral surface of the outer housing 220 or the inner housing.

The outer housing 220 may have a round shape at a corner where the upper surface and the outer peripheral surface 221 meet. In this example, the first voice recognition device 410 and the second voice recognition device 420 may be disposed inside the round shape when viewed from above.

The voice recognition device 400 may be disposed at a predetermined interval from the outer peripheral surface 221 of the housing. When the voice recognition device 400 is too close to the housing, a noise may occur when the housing collides with an obstacle, and vibration may occur, thereby impairing voice recognition efficiency. Accordingly, the voice recognition device 400 may be disposed at a predetermined interval from the outer peripheral surface 221 of the housing.

When a shortest distance from the outer peripheral surface 221 of the housing to the first voice recognition device 410 is referred to as L1, and a shortest distance from the outer peripheral surface 221 of the housing to the second voice recognition device 420 is referred to as L2, then L1 may be shorter than L2. The shortest distance from the outer peripheral surface 221 of the housing to the first communication hole 223 may be shorter than (or less than) the shortest distance from the outer peripheral surface 221 of the housing to the second communication hole 331. When the shortest distance L1 from the outer peripheral surface 221 of the housing to the first voice recognition device is shorter than (or less than) the shortest distance L2 from the outer peripheral surface 221 of the housing to the second voice recognition member, voice recognition efficiency may be improved. In addition, the second voice recognition device 420 is disposed at an end of the housing of the moving robot, and it is inevitable that more vibrations are generated at the end of the housing. Accordingly, the second voice recognition device 420 is disposed further inward than the first voice recognition device 410. Thus, noise generation may be reduced at the end of the housing.

A length from the central point O to the first voice recognition device 410 may be longer than a length from the central point O to the second voice recognition device 420.

More specifically, the shortest distance L1 from the outer peripheral surface 221 of the housing to the first voice recognition device 410 may be 13 mm, and the shortest distance L2 from the outer peripheral surface 221 of the housing to the second voice recognition device 420 may be 15.2 mm. The numerical value may have an error within 5%, and even if it is not, the numerical value may include an error of a degree capable of obtaining a similar voice recognition efficiency within a range which can be easily changed by a person skilled in the art. When the interval between the first or second voice recognition device and the outer peripheral surface 221 of the housing is determined according to the above dimensions, voice recognition efficiency may be maximized.

Referring to FIG. 1, the vertical center axis (y axis), the central point O, and the voice recognition device 400 may form an angle. The vertical center axis (y axis) and a straight line connecting the central point O and the voice recognition device 400 may form an angle.

An angle θ1 between the vertical center axis and the straight line connecting the central point to the first voice recognition device may be less than an angle θ2 between the vertical center axis and the straight line connecting the central point O to the second voice recognition device.

An angle between the vertical center axis and a straight line connecting the central point O and the first voice recognition device 410 to each other may be referred to as θ1. An angle between the vertical center axis and a straight line connecting the central point O to the second voice recognition device 420 may be referred to as θ2. In this example, θ1 may be smaller than θ2.

When θ1 is smaller than θ2, the second voice recognition device 420 may be disposed more diagonally than the first voice recognition device 410, and the second voice recognition device 420 may be disposed behind the first voice recognition device 410. When the first voice recognition device 410 is disposed behind the horizontal center axis (x axis), the second voice recognition device 420 may be disposed inside the rear of the first voice recognition device 410.

Referring to FIG. 1, the angle formed by the first voice recognition device 410, the central point O, and the second voice recognition device 420 may be an acute angle. The angle formed by the first voice recognition device 410, the central point O, and the second voice recognition device 420 may be referred to as θ2-θ1 in FIG. 1. When the angle formed by the first voice recognition device 410, the central point O, and the second voice recognition device 420 is a right angle or an obtuse angle, an interval between the first voice recognition device 410 and the second voice recognition device 420 is too large, and thus the voice recognition efficiency decreases. Therefore, by setting the angle formed by the first voice recognition device 410, the central point O, and the second voice recognition device 420 to an acute angle, voice recognition efficiency may be maintained.

As described above, the first voice recognition device 410 is disposed to be separated from the outer peripheral surface 221 of the housing at a predetermined interval, and it is possible to easily dispose the second voice recognition device 420 so that a predetermined interval is maintained between the first voice recognition device 410 and the second voice recognition device 420 using a Polar coordinate system.

The second voice recognition device 420 may be disposed between 8 cm to 12 cm from the first voice recognition device 410. When the distance between the first voice recognition device 410 and the second voice recognition device 420 is 8 cm to 12 cm, voice recognition efficiency is maximized. If the distance between the first voice recognition device 410 and the second voice recognition device 420 is less than 8 cm, the difference between the first voice data obtained from the first voice recognition device 410 and the second voice data obtained from the second voice recognition device 420 is so small, and thus it is difficult to select the noise. If the distance between the first voice recognition device 410 and the second voice recognition device 420 is greater than 12 cm, the difference between the first voice data and the second voice data is too large, and it is difficult to select the voice command. Therefore, it is preferable that the second voice recognition device 420 is designed so as to be disposed between 8 cm to 12 cm from the first voice recognition device 410.

As shown in FIG. 6, the moving robot may include a noise recognition device (or noise recognition member) 520 which is disposed adjacent to the suction motor 511 and which measures an internal noise generated by the suction motor 511. The suction motor 511 may be replaced with a noise generating member 510 which generates a noise, including a driving motor and an air discharge port.

The noise recognition device 520 recognizes the noise generated by the noise generating member 510, transmits data to the controller, and interlocks with the voice recognition device to remove noise and select the voice command.

A distance L3 between the noise recognition device and the suction motor can be designed to be shorter than the distance L4 between the voice recognition device and the suction motor. A distance between the noise recognition device 520 and the noise generating member 510 may be designed to be shorter than (or less than) a distance between the voice recognition device voice recognition device 400 and the noise generating member 510. That is, the noise recognition device 520 may be disposed closer to the noise generating member 510 than the voice recognition device 400. When the noise recognition device 520 is disposed farther away from the noise generating member 510 than the voice recognition device 400, the noise is recognized larger than the voice command, and it is difficult to select the voice command. Therefore, by disposing the noise recognition device 520 closer than the voice recognition device 400, the noise recognition device 520 recognizes only the noise and removes the noise from the voice data recognized by the voice recognition device 400, and thus voice recognition efficiency may be increased.

The distance L3 between the noise recognition device and the suction motor may not exceed 10 cm. The distance between the noise recognition device 520 and the noise generating member 510 may not exceed 10 cm. When there are a plurality of noise generating members 510, a noise generating member generating a largest noise among the noise generating members is used as a reference. That is, a distance between the noise recognition device 520 and the noise generating member 510 generating the largest noise may not exceed 10 cm. As described above, the noise recognition device 520 is a device for accurately recognizing only noise, and when the noise recognition device 520 is farther than 10 cm from the noise generating member 510, the noise cannot be accurately recognized. Therefore, the noise recognition device 520 is disposed not to exceed 10 cm from the noise generating member 510. The numerical value may have an error within 5%, and even if it is not, the numerical value may include an error of a degree capable of obtaining a similar voice recognition efficiency within a range which can be easily changed by a person skilled in the art.

Figure 9:
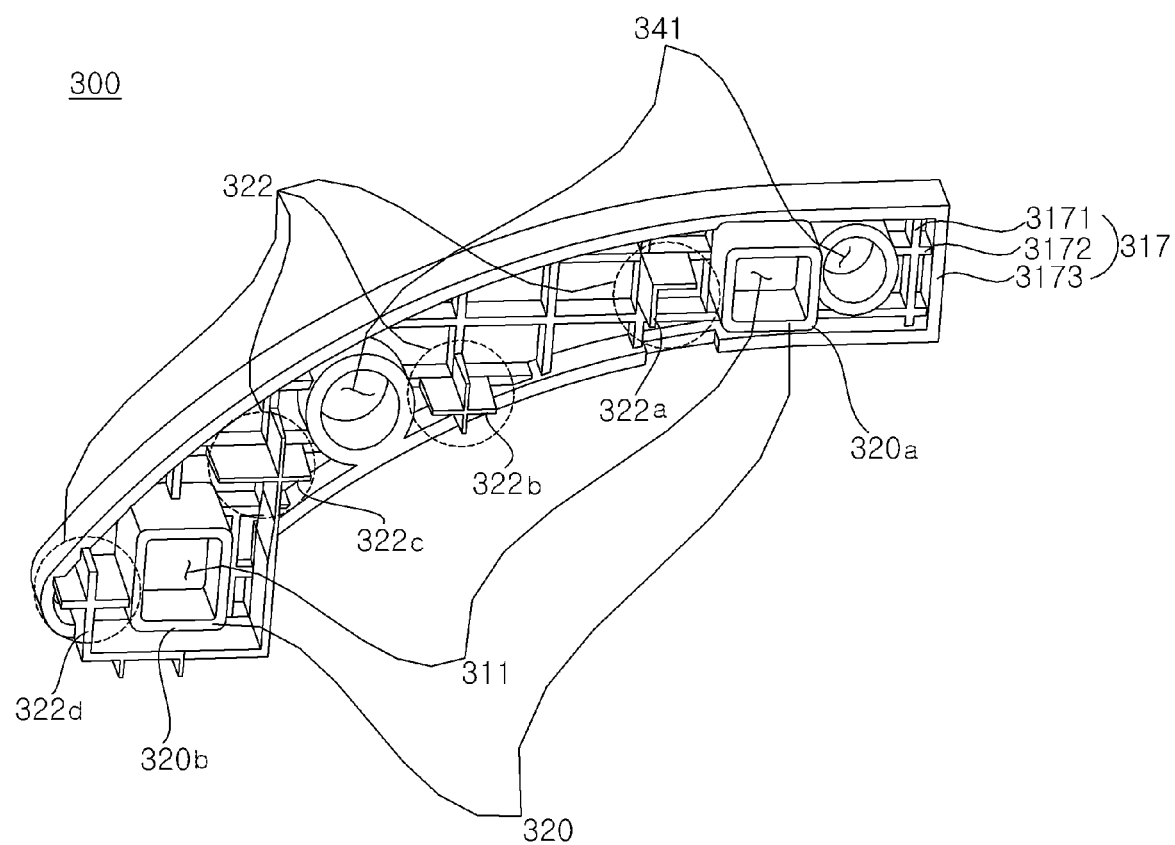
FIG. 9 is a perspective view illustrating a lower portion of a microphone mount.
Figure 10:
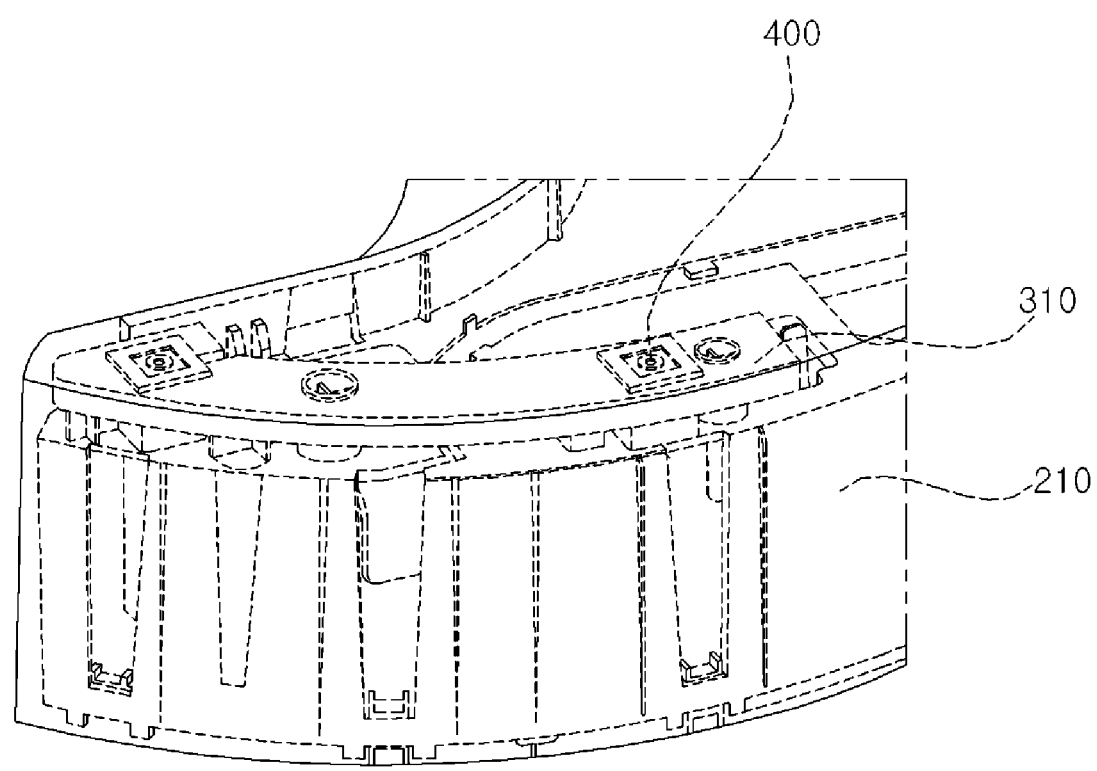
FIG. 10 is a perspective view illustrating a portion of an inner housing to which the voice recognition module is coupled.
Figure 11:
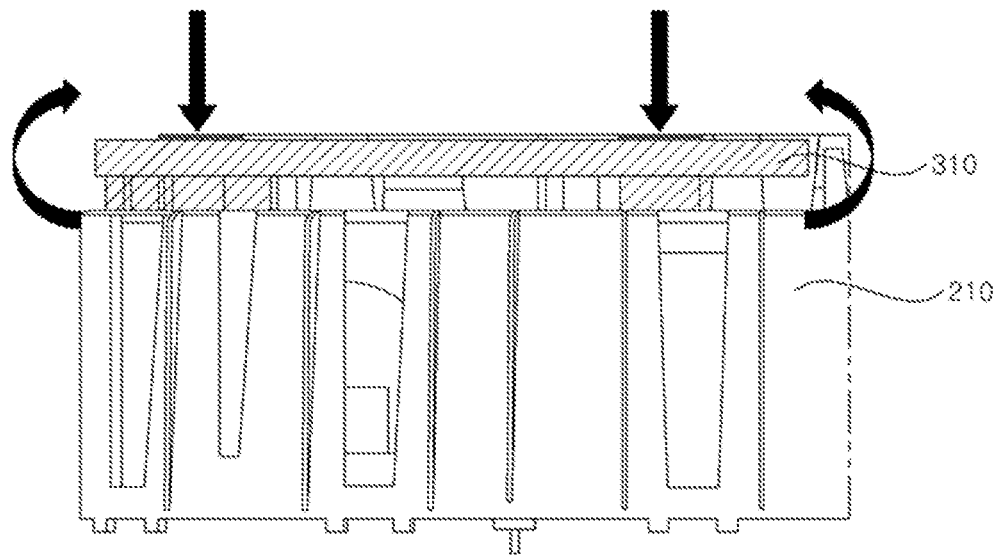
FIG. 11 is a view schematically illustrating a load applied to the microphone mount when a bending prevention rib is not present between the voice recognition modules in FIG. 10.
Figure 12:
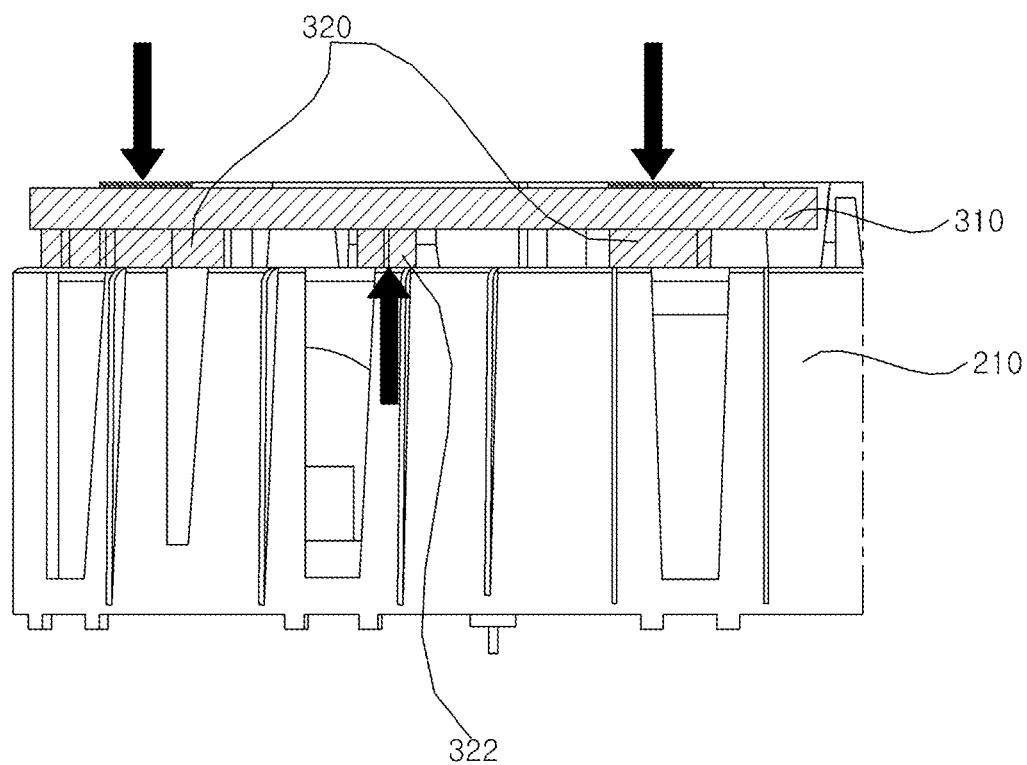
FIG. 12 is a view schematically illustrating the load applied to the microphone mount when the bending prevention rib is present between the voice recognition modules in FIG. 10.

A microphone mount 300 is a support module for supporting and fixing the voice recognition device 400, and may be described with reference to FIG. 9. The microphone mount 300 is a device to be disposed below the voice recognition device 400, to support the voice recognition device 400, and to cause the voice recognition device 400 to be in close contact with the housing. When the microphone mount 300 causes the voice recognition device 400 to be in close contact with the housing, the microphone mount 300 may receive a dispersion force as a reaction force. Alternatively, when the microphone mount 300 includes the microphone gasket 330, the microphone mount 300 may receive the reaction force unevenly. When a dispersion force is applied to the microphone mount 300 or an uneven reaction force is applied to the microphone mount 300, a problem may occur in which the microphone mount 300 is twisted or bent. Therefore, the voice recognition device 400 cannot be appropriately sealed, and voice recognition efficiency may be reduced. In order to solve this, a twist prevention rib 317 or a bending prevention rib 322 is provided.

The microphone mount 300 is disposed below the voice recognition device 400, and the voice recognition device 400 is mounted above the microphone mount 300. The microphone mount 300 is supported by the inner housing 210 and causes the voice recognition device 400 to be in close contact with the outer housing 220. More specifically, a lower portion of the microphone mount 300 is supported by an upper surface of the inner housing 210, and an upper portion of the microphone mount 300 causes the voice recognition device 400 to be in close contact with a lower surface 225 of the outer housing 220.

The microphone mount 300 may include a microphone mount body 310 on which the voice recognition device 400 is mounted, and a microphone mount leg 320 or the bending prevention rib 322 which is disposed in a lower portion of the microphone mount body 310 to be in contact with the upper surface of the inner housing 210. The microphone mount 300 may further include the microphone gasket 330 which is disposed above the microphone mount body 310 to be in contact with the lower surface 225 of the outer housing 220. That is, the microphone mount body 310 is disposed below the voice recognition device 400, and the microphone gasket 330 is disposed above the voice recognition device 400 to fix and seal the voice recognition device 400.

The microphone mount 300 includes the microphone mount body 310 on which voice recognition devices 400 separated from each other are mounted. The microphone mount 300 includes the microphone mount leg 320 which protrudes from a portion which on the voice recognition device 400 is mounted to a lower side of the microphone mount body 310 and is supported by the inner housing 210. The microphone mount 300 includes the bending prevention rib 322 which is disposed between two microphone mount legs 320, protrudes from the lower side of the microphone mount body 310, and is supported by the inner housing 210. The microphone mount 300 supports the voice recognition device.

The voice recognition device is mounted above the microphone mount body 310. The microphone mount body 310 is disposed below the voice recognition device 400, and the voice recognition device 400 is mounted on the microphone mount body 310. Two or more voice recognition devices 400 separated from each other may be mounted on the microphone mount body 310.

The microphone mount body 310 extends along the outer peripheral surface 221 of the outer housing 220. In an example embodiment, the voice recognition device is disposed along the outer peripheral surface 221 of the outer housing 220, and the microphone mount body 310 also extends along the outer peripheral surface 221 of the outer housing 220. Accordingly, the voice recognition device can be mounted on the microphone mount body 310 along the outer peripheral surface 221 of the housing.

The microphone mount 300 may include a second recessed portion 311 which is recessed downward and into which at least a portion of the lower portion of the voice recognition device is inserted.

The voice recognition device is mounted on the second recessed portion 311. When there are two voice recognition devices, two second recessed portions 311 are formed in the microphone mount body 310. A shape of the second recessed portion 311 matches a cross-sectional shape of the voice recognition device. The second recessed portion 311 fixes the voice recognition device, prevents the voice recognition device from moving to the side, and is disposed in a line with the communication hole so as to vertically overlap the communication hole. The second recessed portion 311 causes the voice recognition device and the communication hole to be disposed in a line, and thus improve the voice recognition efficiency.

The microphone mount leg 320 protrudes downward from the microphone mount body 310 and is supported by the inner housing 210. The microphone mount leg 320 is vertically overlapped with the voice recognition device. The microphone mount leg 320 supports most of a force received by the microphone mount body 310. The microphone mount leg 320 protrudes downward from the portion on which the voice recognition device is mounted so that a bending stress is not generated, but the design may be changed according to design conditions and a force distribution.

The microphone mount leg 320 may be integrally formed with the microphone mount body 310, or may be formed separately from the microphone mount body 310 and be coupled to the microphone mount body 310.

The microphone mount leg 320 may be formed by further protruding a portion of the twist prevention rib 317, or may be formed to protrude separately from the twist prevention rib 317.

The bending prevention rib 322 protrudes downward from the microphone mount body 310 and is supported by the inner housing 210. The bending prevention rib 322 may support a portion of the force received by the microphone mount 300 and support a force smaller than the force received by the microphone mount leg 320. The bending prevention rib 322 cancels a moment in the microphone mount 300 to remove the bending stress generated in the microphone mount 300.

The bending prevention rib 322 may be disposed between the microphone mount legs 320. If there are two microphone mount legs 320 as shown in FIG. 9, the bending prevention rib 322 may be disposed between the two microphone mount legs 320. The bending prevention rib 322 is disposed between the two microphone mount legs 320 to support a center of the microphone mount body 310, to prevent sagging in the center of the microphone mount body 310, and to remove the bending stress.

A plurality of bending prevention ribs 322 may be provided. In this example, at least one bending prevention rib 322 is disposed between two of the microphone mount legs 320. Referring to FIG. 9, one bending prevention rib 322 is disposed behind the microphone mount leg 320 disposed at the rear, and three bending prevention ribs 322 are disposed between the two microphone mount legs 320.

The twist prevention rib 317 is a member that prevents the microphone mount 300 from being twisted by a dispersion force or a non-uniform force. Additionally, the twist prevention rib 317 has an effect of preventing the bending of the microphone mount body 310 to some extent.

The twist prevention rib 317 may protrude downward from a lower portion of the microphone mount body 310. The twist prevention rib 317 may include a plurality of horizontal ribs 3172 disposed in parallel, and a vertical rib 3171 which intersects the horizontal rib 3172 at least once. The twist prevention rib 317 may include a peripheral rib 3173 protruding downward from the outer peripheral surface of the microphone mount body 310. The twist prevention rib 317 may be formed integrally with the microphone mount body 310.

The twist prevention rib 317 may form a skeleton of the microphone mount body 310. Compared to forming the microphone mount body 310 with a thicker width, forming the twist prevention rib 317 has an effect of reducing a material cost and preventing twisting more effectively.

In the twist prevention rib 317, the horizontal rib 3172 and the vertical rib 3171 may intersect each other. A plurality of horizontal ribs 3172 and a plurality of vertical ribs 3171 may be provided. The horizontal rib 3172 and the vertical rib 3171 may intersect each other at least once. The horizontal ribs 3172 and the vertical ribs 3171 may be orthogonal to each other as shown in FIG. 9. However, the present disclosure is not limited thereto, and the horizontal ribs 3172 and the vertical ribs 3171 may intersect each other at an unspecified angle. The horizontal rib 3172 does not necessarily need to be parallel to the horizontal center axis (x axis), and the vertical rib 3171 does not necessarily need to be parallel to the vertical center axis (y axis). When the horizontal ribs 3172 and the vertical ribs 3171 intersect each other, there may be an effect of effectively preventing twisting caused by loads applied from multiple angles in an arbitrary direction.

The peripheral rib 3173 may protrude downward from the outer peripheral surface of the microphone mount body 310. The peripheral rib 3173 may form a side surface of the microphone mount body 310. The peripheral rib 3173 may form the side surface of the microphone mount body 310, and thus effectively prevent the twisting of the microphone mount body 310. Additionally, the peripheral rib 3173 may have an effect of preventing the bending of the microphone mount body 310.

The peripheral rib 3173 may be connected to an end of the horizontal rib 3172 or an end of the vertical rib 3171. The peripheral rib 3173 may be integrally formed with the microphone mount body 310, and may be integrally formed with the horizontal rib 3172 and the vertical rib 3171. The peripheral rib 3173 is connected to the horizontal rib 3172 or the vertical rib 3171. Thus, there may be an effect of distributing a stress applied to the horizontal rib 3172 or the vertical rib 3171. Conversely, there may be an effect of distributing a stress applied to the peripheral rib 3173 to the horizontal rib 3172 or the vertical rib 3171.

The peripheral rib 3173 may protrude further downward than the horizontal rib 3172 or the vertical rib 3171. The peripheral rib 3173 may be formed in a curved surface along the outer shape of the microphone mount 300. Therefore, the peripheral rib 3173 protrudes further downward than the horizontal rib 3172 or the vertical rib 3171, and the peripheral rib 3173 may have an effect of withstanding the stress to an equal degree with the horizontal rib 3172 or the vertical rib 3171, may have an effect of easily exchanging the stress with the horizontal rib 3172 or the vertical rib 3171, and also may have an effect of giving an aesthetic feeling in appearance.

The bending prevention rib 322 may extend from a portion of the twist prevention rib 317 to come into contact with the upper surface of the inner housing 210. The bending prevention rib 322 may be formed integrally with the twist prevention rib 317. The bending prevention rib 322 may be formed integrally with the twist prevention rib 317, and may extend from a portion of the twist prevention rib 317. Thus, the stress applied to the bending prevention rib 322 is easily and quickly transmitted to the twist prevention rib 317 to be distributed to the twist prevention rib 317.

The bending prevention rib 322 may extend from a portion of the horizontal rib 3172 to be integrally formed with the horizontal rib 3172. The bending prevention rib 322 may extend from a portion of the vertical rib 3171 and may be integrally formed with the vertical rib 3171. Alternatively, the bending prevention rib 322 may extend at the same time from a portion of each of the horizontal rib 3172 and the vertical rib 3171 to form a grid shape.

The horizontal rib 3172, the vertical rib 3171, and the peripheral rib 3173 may be formed below the microphone mount body 310 to form a skeleton of the microphone mount 300. Accordingly, there may be an effect of preventing the microphone mount body 310 from being twisted by the dispersion force applied from the outer housing 220 or the external force unevenly applied due to including the mount gasket 330.

The microphone gasket 330 may be described with reference to FIGS. 4 and 7. The microphone gasket 330 may prevent a noise from being introduced into the gap between the upper portion of the voice recognition device and the outer housing 220. Additionally, the microphone gasket 330 has the effect of fixing the voice recognition device to the outer housing 220. The microphone gasket 330 also acts as a bumper to prevent damages due to collision of the voice recognition device with the housing when vibrations occur in the moving robot.

The microphone gasket 330 may be formed of an elastic material. The microphone gasket 330 may be formed of a nano cell material so that a noise is not introduced through the foam hole.

The microphone gasket 330 may be disposed between the upper portion of the voice recognition device and the upper surface of the outer housing. The microphone mount 300 is disposed below the voice recognition device, and closes the voice recognition device upward from below. Accordingly, the microphone gasket 330 is deformed according to the external force, and the gap between the voice recognition device and the outer housing 220 is filled with the microphone gasket 330.

Figure 4:
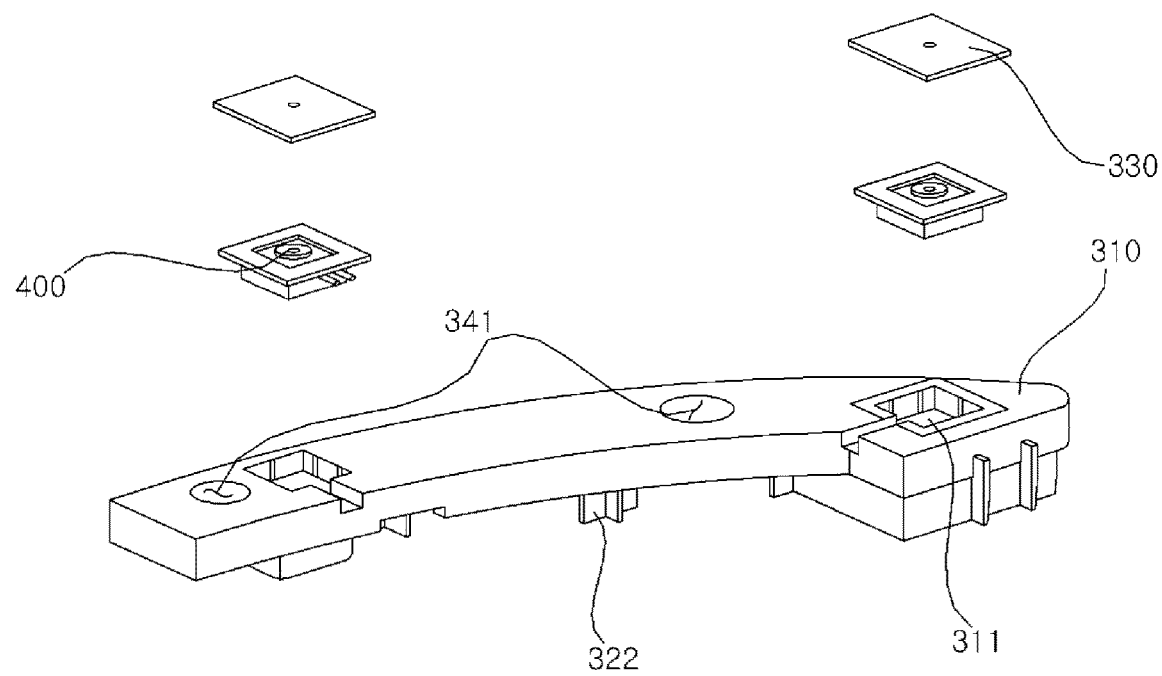
FIG. 4 is an enlarged view of a voice recognition module and fastening members thereof in FIG. 3.

A shape of the microphone gasket 330 may be a rectangular plate as shown in FIG. 4. However, embodiments are not limited thereto, and includes changes to an extent that a person skilled in the art can easily change. For example, a recessed portion may be formed inside a lower portion of the microphone gasket 330 so that a portion of the voice recognition device can be inserted into the recessed portion. In this example, the microphone gasket 330 covers the upper and side surfaces of the voice recognition device at the same time. Thus, there may be an effect of preventing the inflow of the noise more efficiently.

The outer housing 220 may include a first recessed portion 227 which is recessed upward and into which at least a portion of the upper portion of the microphone gasket 330 is inserted. The first recessed portion 227 is recessed upward from one side of the outer housing 220. A shape of the first recessed portion 227 matches the cross-sectional shape of the microphone gasket 330. The first recessed portion 227 may prevent the microphone gasket 330 from moving to the side, and causes the second communication hole 331 to be disposed to vertically overlap the first communication hole 223 and the voice sensor. The second recessed portion 311 may cause the first communication hole 223, the second communication hole 331, and the voice recognition 400 member to be disposed in a line, and thus improve the voice recognition efficiency.

Figure 7:
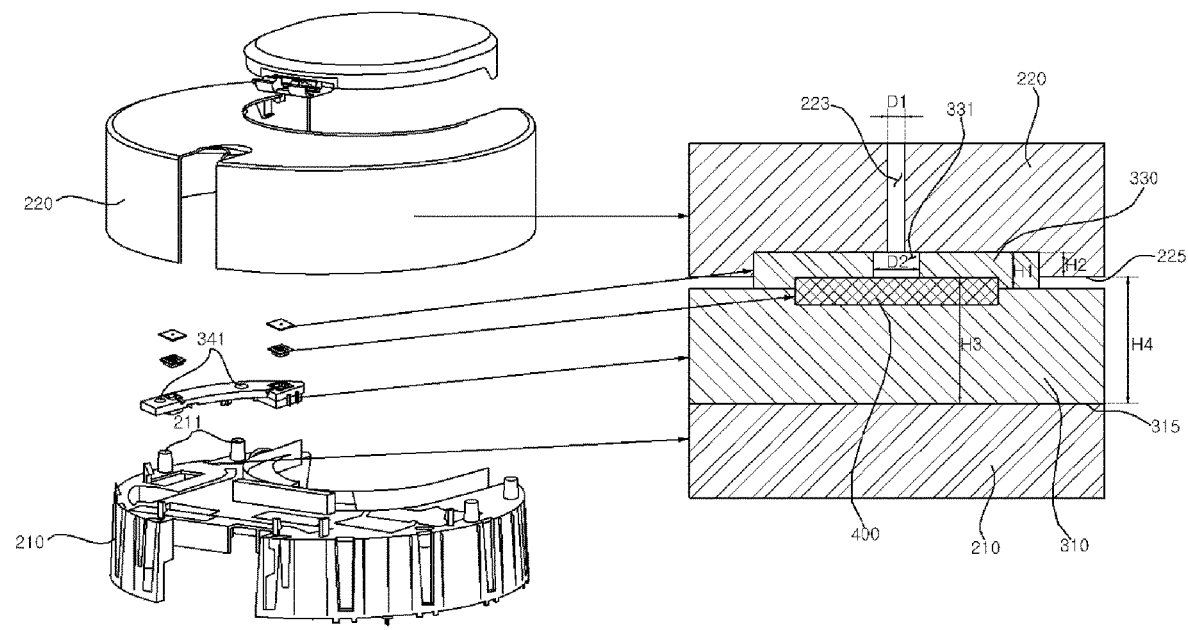
FIG. 7 is a cross-sectional view schematically illustrating a coupling structure of the voice recognition module.
Figure 8:
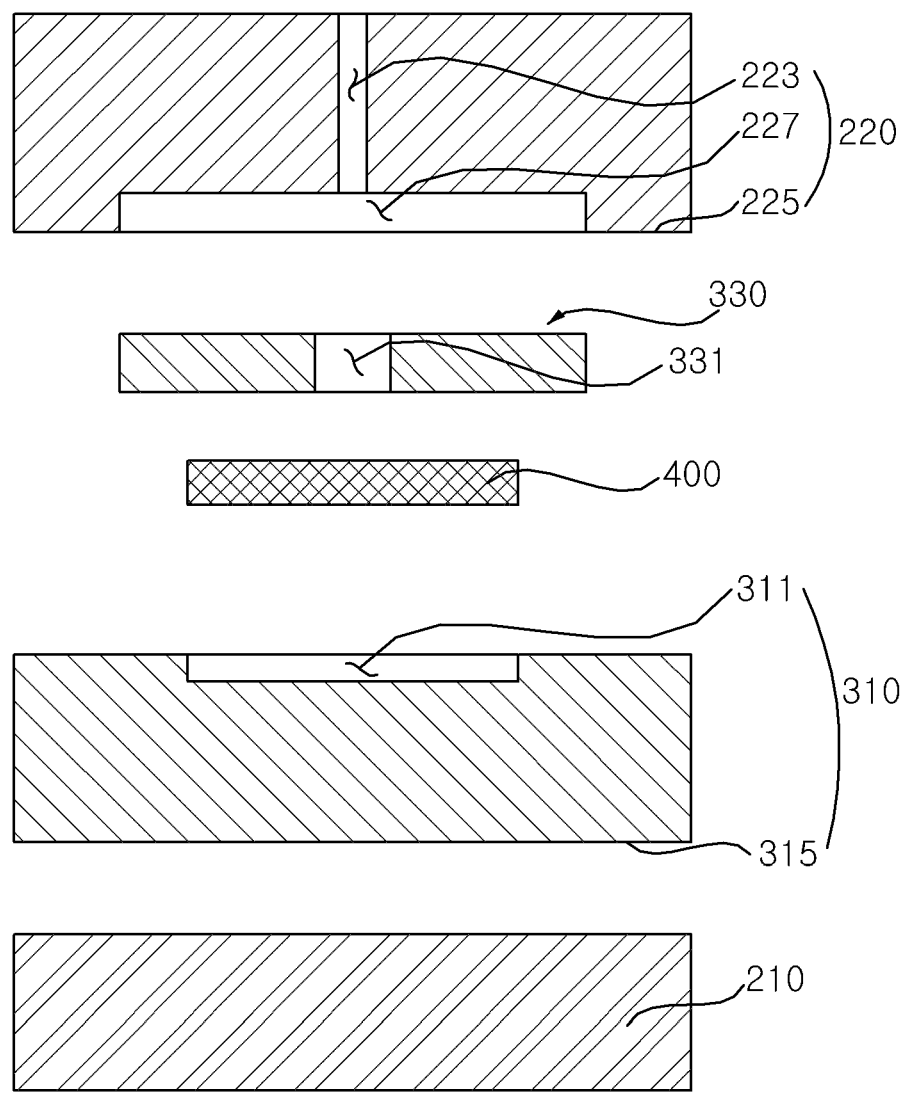
FIG. 8 is a view illustrating a state where configurations of FIG. 7 are separated from each other.

Referring to FIG. 7, a depth H2 of the first recessed portion 227 may be smaller than a thickness H1 of the microphone gasket 330. Thus, the lower surface of the microphone gasket 330 can be located below the lower surface 225 of the outer housing 220. When the voice recognition device is fastened to the housing, if the thickness of the microphone gasket is not sufficient, there is a concern that the lower surface 225 of the outer housing and the upper surface of the microphone mount 300 may come into contact with each other. When the lower surface 225 of the outer housing and the upper surface of the microphone mount come into contact with each other, there is a problem that a portion between the voice recognition device and the outer housing 220 is not sealed. Accordingly, a noise may be generated according to the contact, and noise recognition efficiency may be reduced. Accordingly, the depth H2 of the first recessed portion 227 may be smaller than the thickness H1 of the microphone gasket 330.

The thickness H1 of the microphone gasket 330 is 0.3 mm to 1 mm. If the thickness H1 of the microphone gasket 330 is too thin, there may be a problem in that the lower surface 225 of the outer housing and the upper surface of the microphone mount come into contact with each other even with small vibrations, and bumper performance is deteriorated. Meanwhile, if the thickness H1 of the microphone gasket 330 is too thick, there is a problem that the voice recognition efficiency decreases due to the inflow of the noise because the noise cannot be properly blocked. Therefore, in order to maintain the voice recognition efficiency against the vibrations of the moving robot and maintain sufficient noise prevention effect, it is preferable to set the thickness H1 of the microphone gasket 330 to 0.3 mm to 1 mm.

The first communication hole 223 may penetrate the outer housing 220. More specifically, the first communication hole 223 may penetrate the outer housing 220 at the position vertically overlapping the sensor of the voice recognition module.

The second communication hole 331 may penetrate the microphone gasket 330. More specifically, the second communication hole 331 may penetrate the outer housing 220 at the position vertically overlapping the sensor of the voice recognition module.

That is, the first communication hole 223, the second communication hole 331, and the voice sensor of the voice recognition module are disposed to vertically overlap each other. Thus, the voice command arrives at the voice sensor of the voice recognition module through the first communication hole 223 and the second communication hole 331 from above the outer housing 220.

A diameter D2 of the second communication hole 331 may be larger than a diameter D1 of the first communication hole 223. Therefore, a cross-sectional area of the second communication hole 331 is larger than a cross-sectional area of the first communication hole 223. This is similar to a principle of a loudspeaker, and when an external voice command passes through the first communication hole 223 and arrives at the second communication hole 331, a sound is amplified. Accordingly, the voice recognition module can more accurately recognize the voice command.

Referring to FIG. 7, the upper surface of the microphone mount and the lower surface 225 of the outer housing 220 are disposed to be vertically separated from each other. The separation distance can be adjusted by a material or thickness of the microphone gasket 330. If the separation distance between the upper surface of the microphone mount and the lower surface 225 of the outer housing 220 is too short, the upper surface and the lower surface may collide with each other according to vibrations of the moving robot. Thus, there is a problem that each member is damaged, a noise is generated, and the recognition efficiency is reduced. Meanwhile, if the separation distance between the upper surface of the microphone mount and the lower surface 225 of the outer housing 220 is too long, there is a problem that the noise generated by the noise generating member 510 disposed inside the moving robot is introduced and the voice recognition efficiency is reduced. Therefore, it is necessary to maintain an appropriate separation distance by forming a member/device according to the numerical value described below.

A height H3 from the microphone mount lower surface 315 to the top of the voice recognition device voice recognition device 400 may not be less than the height H4 from the microphone mount lower surface 315 to the lower surface 225 of the outer housing 220. Furthermore, the height H3 from the microphone mount lower surface 315 to the top of the voice recognition device may be the same as the height H4 from the microphone mount lower surface 315 to the outer housing lower surface 225. That is, the height of the upper surface of the voice recognition device may be higher than or equal to the lower surface 225 of the outer housing 220. In addition, when viewed from the side, the voice recognition device voice recognition device 400 and the outer housing 220 may form an overlap. When there is a portion overlapping the voice recognition device voice recognition device 400 and the outer housing 220, a noise may be introduced from the side and then bent upward at least once and then introduced. Therefore, there is an effect of further preventing the inflow of noise.

A structure in which the voice recognition device, according to an example embodiment, is coupled to the housing may be described.

The microphone mount body 310 may include a couple hole 341. As shown in FIG. 9, the microphone mount leg 320 includes a first microphone mount leg 320a, and a second microphone mount leg 320b. The first microphone mount leg 320a is disposed in front of the second microphone mount leg 320b. One coupling hole 341 is formed in the front portion of the first microphone mount leg 320a.

The microphone mount body 310 may include the bending prevention rib 322, The bending prevention rib 322 may include a first bending prevention rib 322a, a second bending prevention rib 322b, a third bending prevention rib 322c and a fourth bending prevention rib 322d. The first bending prevention rib 322a is disposed in front of the second bending prevention rib 322b, the second bending prevention rib 322b is disposed in front of the third bending prevention rib 322c, and the third bending prevention rib 322c is disposed in front of the fourth bending prevention rib 322d. The other coupling hole 341 is formed between the second bending prevention rib 322b and the third bending prevention rib 322c.

A coupling protrusion 211 may protrude from the upper surface of the inner housing 210 and be inserted into the coupling hole 341. A coupling member is disposed at an upper end of the coupling protrusion 211 and may be fastened to the outer housing 220. The couple protrusion 211 may have a shape which is downward widened and upward narrowed. The coupling protrusion 211 may be formed in a circular shape, and a diameter of a bottom end of the coupling protrusion 211 may be larger than a diameter of an upper end thereof.

The coupling protrusion 211 may be fastened to the outer housing 220 in a state of being inserted into the coupling hole 341. The coupling protrusion 211 is formed to have a shape which is downward widened and upward narrowed, and causes the microphone mount 300 to be in close contact with the outer housing 220. The microphone gasket 330 is disposed above the microphone mount 300, and the communication hole at the upper end of the voice recognition device is sealed from the inner space, and vibrations of the voice recognition device can be absorbed.

Embodiments of the present disclosure are illustrated and described. However, the present disclosure is not limited to the specific embodiments described above, it is possible to implement various modifications by a person having ordinary knowledge in a technical field to which the present invention belongs without departing from the gist of the present disclosure described in claims, the modified implementations should not be understood individually from the technical idea or perspective of the present disclosure.

The present disclosure is to provide a moving robot having a microphone disposition structure which maintains voice recognition efficiency while disposing a microphone inside the moving robot.

Tasks of the present disclosure are not limited to the tasks mentioned above, and other tasks that are not mentioned will be clearly understood by a person skilled in the art from the following description.

In an aspect, there is provided a moving robot including: a main body which forms a space therein; an inner housing which surrounds the main body; an outer housing which is coupled to the inner housing and forms an outer shape; two voice recognition members which are disposed between the inner housing and the outer housing and are disposed to be separated from each other; a microphone mount which is supported by the inner housing and causes the voice recognition device to be in close contact with the outer housing. The microphone mounts include a microphone mount body on which the voice recognition members separated from each other are mounted, a microphone mount leg which protrudes downward from the microphone mount body at a portion on which the voice recognition device is mounted and is supported by the inner housing, and a bending prevention rib which is disposed between two microphone mount legs, protrudes downward from the microphone mount body, and is supported by the inner housing.

The microphone mount body may be disposed below the voice recognition device and extends along an outer peripheral surface of the outer housing. The microphone mount may further include a twist prevention rib which protrudes downward at a lower end of the microphone mount body. The microphone mount may form a second recessed portion which is recessed downward and into which at least a portion of a lower portion of the voice recognition device is inserted.

The voice recognition device may be mounted above the microphone mount, and may include a microphone gasket which is disposed between an upper portion of the voice recognition device and a lower surface of the outer housing. An upper surface of the microphone mount and a lower surface of the outer housing may be disposed to be separated from each other vertically.

According to a moving robot of the present disclosure, there are one or more of the following effects. Firstly, the microphone mount includes at least one bending prevention rib between the microphone mount legs. Accordingly, it is possible to prevent the bending of the microphone mount, prevent a noise from being introduced into the voice recognition member, and maximize the voice recognition efficiency. Secondly, the microphone mount includes the twist prevention rib. Accordingly, it is possible to prevent the twisting of the microphone mount, prevent a noise from being introduced into the voice recognition member, and maximize the voice recognition efficiency. Thirdly, the microphone gasket is provided between the voice recognition device and the outer housing. Accordingly, it is possible to fix the voice recognition member, prevent a noise from being introduced into the voice recognition member, and protect the voice recognition device from a noise.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
   a main body;
   an inner housing that surrounds part of the main body;
   an outer housing coupled to the inner housing;
   a voice recognition device disposed between the inner housing and the outer housing; and
   a microphone mount supported by the inner housing,
   wherein the microphone mount includes:
      a microphone mount body on which to mount the voice recognition device;
      a microphone mount leg that protrudes downward from the microphone mount body at a portion on which the voice recognition device is mounted, and the microphone mount leg is supported by the inner housing; and
      a microphone gasket disposed between an upper portion of the voice recognition device and the outer housing.

2. The robot of claim 1, wherein the microphone mount is disposed below the voice recognition device.

3. The robot of claim 1, wherein the microphone gasket is provided in a gap between the voice recognition device and the outer housing.

4. The robot of claim 1, wherein the microphone gasket includes a recessed portion formed at a lower portion of the microphone gasket, and
   at least of a portion of the voice recognition device is provided in the recessed portion.

5. The robot of claim 1, further comprising:
   a twist prevention rib that protrudes downward from a lower portion of the microphone mount body.

6. The robot of claim 5, wherein the twist prevention rib includes:
   a plurality of horizontal ribs disposed to be parallel to each other; and
   a vertical rib that intersects at least one of the horizontal ribs.

7. The robot of claim 6, wherein the twist prevention rib further includes a peripheral rib that protrudes downward from an outer peripheral surface of the microphone mount body.

8. The robot of claim 7, wherein the vertical rib intersects at least one of the plurality of horizontal ribs.

9. The robot of claim 8, wherein the peripheral rib may be connected to an end of the at least one of the horizontal ribs or an end of the vertical rib.

10. The robot of claim 8, wherein the peripheral rib is connected to the at least one of the horizontal ribs or the vertical rib.

11. A robot comprising:
a body;
an inner housing that surrounds part of the body;
an outer housing to couple to the inner housing;
a voice recognition device disposed between the inner housing and the outer housing; and
a microphone mount on the inner housing,
wherein the microphone mount includes:
 a mount body on which to provide the voice recognition device;
 a mount leg that extends from the mount body; and
 a gasket disposed between the voice recognition device and the outer housing.

12. The robot of claim 11, wherein the gasket is provided between the voice recognition device and a lower surface of the outer housing.

13. The robot of claim 11, wherein the gasket is provided within a recess of the outer housing.

14. The robot of claim 11, wherein the microphone mount is disposed below the voice recognition device.

15. The robot of claim 11, wherein the gasket is provided in a gap between the voice recognition device and the outer housing.

16. The robot of claim 11, wherein the gasket includes a recess at a lower portion of the gasket, and
at least of a portion of the voice recognition device is provided in the recess.

17. The robot of claim 11, further comprising:
a twist prevention rib that protrudes from a lower portion of the mount body.

18. The robot of claim 17, wherein the twist prevention rib includes:
a plurality of horizontal ribs disposed to be parallel to each other; and
a vertical rib that intersects at least one of the horizontal ribs.

19. The robot of claim 18, wherein the twist prevention rib further includes a peripheral rib that protrudes from an outer peripheral surface of the mount body.

20. The robot of claim 19, wherein the vertical rib intersects at least one of the plurality of horizontal ribs.

* * * * *